(12) United States Patent
Khatri et al.

(10) Patent No.: US 12,273,132 B2
(45) Date of Patent: Apr. 8, 2025

(54) SPURIOUS EMISSIONS DETECTION AND CALIBRATION USING ENVELOPE DETECTOR

(71) Applicant: Renesas Electronics America Inc., Milpitas, CA (US)

(72) Inventors: Himanshu Khatri, San Diego, CA (US); Samet Zihir, San Diego, CA (US); Tumay Kanar, San Diego, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 210 days.

(21) Appl. No.: 17/954,428

(22) Filed: Sep. 28, 2022

(65) Prior Publication Data

US 2024/0106469 A1 Mar. 28, 2024

(51) Int. Cl.
*H04B 1/04* (2006.01)
*H04B 17/11* (2015.01)

(52) U.S. Cl.
CPC ............... *H04B 1/04* (2013.01); *H04B 17/11* (2015.01); *H04B 2001/0408* (2013.01)

(58) Field of Classification Search
CPC .......... H03D 7/14; H03D 7/1425; H04B 1/04; H04B 1/10; H04B 1/40; H04B 1/403; H04B 1/515; H04B 1/0475; H04B 17/10; H04B 17/11; H04B 17/104; H04B 2001/0408; H04L 5/14; H04L 7/00; H04L 25/03

USPC ....... 375/219, 221, 224, 295–298, 316, 349; 455/73, 83, 280, 335
See application file for complete search history.

(56) References Cited

U.S. PATENT DOCUMENTS

| | | | | |
|---|---|---|---|---|
| 10,135,472 | B1 * | 11/2018 | Ashry Othman | H04B 1/0475 |
| 10,165,513 | B1 * | 12/2018 | Gorbachov | H04B 1/40 |
| 2015/0333850 | A1 * | 11/2015 | Myoung | H04B 17/11 455/84 |
| 2018/0145632 | A1 * | 5/2018 | Kim | H03F 3/19 |
| 2022/0052644 | A1 * | 2/2022 | Nagarajan | H03D 7/125 |

\* cited by examiner

*Primary Examiner* — Shawkat M Ali
(74) *Attorney, Agent, or Firm* — SCULLY, SCOTT, MURPHY & PRESSER, P.C.

(57) ABSTRACT

Methods and systems for operating a transceiver are described. A transceiver can include an upconverting mixer, a downconverting mixer, a controller, and an envelope detector. The upconverting mixer can mix an input signal with a local oscillator (LO) signal to generate a transmitter signal. The envelope detector can receive the transmitter signal outputted from the upconverting mixer and output an envelope of the transmitter signal to an output line of the downconverting mixer. The envelope can indicate at least one of a leaked LO signal and an image signal. The controller can receive a calibration parameter that is based on at least one of the leaked LO signal and image signal and calibrate the upconverting mixer based on the calibration parameter.

18 Claims, 3 Drawing Sheets

SPURIOUS EMISSIONS DETECTION AND CALIBRATION USING ENVELOPE DETECTOR

BACKGROUND OF THE SPECIFICATION

The present disclosure relates in general to operations of transceivers. More specifically, the present disclosure relates to spurious emissions detection and calibration using an envelope detector that is embedded in a transceiver.

A transceiver can be an integrated circuit (IC) configured to transmit and receive signals. An example application of transceivers can be beamforming systems including components such as a baseband processor, a plurality of transceiver ICs, and a plurality of beamformer ICs connected to a plurality of antennas. The beamformer ICs can have different gain and phase settings. In transmission mode, antennas can output a beam having a shape, a size and a direction based on the different gain and phase settings of the beamformer ICs. In receiving mode, antennas can receive signals of different amplitudes from different directions and the received signals can be combined to form a signal that can be decoded.

SUMMARY

In one embodiment, a semiconductor device for operating a transceiver is generally described. The semiconductor device can include an upconverting mixer, a downconverting mixer, and an envelope detector. The upconverting mixer can be configured to mix an input signal with a local oscillator (LO) signal to generate a transmitter signal. The envelope detector can be configured to receive the transmitter signal outputted from the upconverting mixer. The envelope detector can be configured to output an envelope of the transmitter signal to an output line of the downconverting mixer. The envelope can indicate at least one of a leaked LO signal and an image signal.

In one embodiment, a semiconductor device for operating a transceiver is generally described. The semiconductor device can include an upconverting mixer, a downconverting mixer, a controller, and an envelope detector. The upconverting mixer can be configured to mix an input signal with a local oscillator (LO) signal to generate a transmitter signal. The envelope detector can be configured to receive the transmitter signal outputted from the upconverting mixer. The envelope detector can be further configured to output an envelope of the transmitter signal to an output line of the downconverting mixer. The envelope can indicate at least one of a leaked LO signal and an image signal. The controller can be configured to receive a calibration parameter that is based on at least one of the leaked LO signal and image signal. The controller can be further configured to calibrate the upconverting mixer based on the calibration parameter.

In one embodiment, a method for operating a transceiver. The method can include mixing an input signal with a local oscillator (LO) signal to generate a transmitter signal. The method can further include tapping the transmitter signal at an output terminal of an upconverting mixer in a transceiver. The method can further include outputting an envelope of the transmitter signal to an output line of a downconverting mixer in the transceiver. The envelope can indicate at least one of a leaked LO signal and an image signal. The method can further include calibrate the upconverting mixer using a calibration parameter that is based on the leaked LO signal and the image signal in the envelope.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
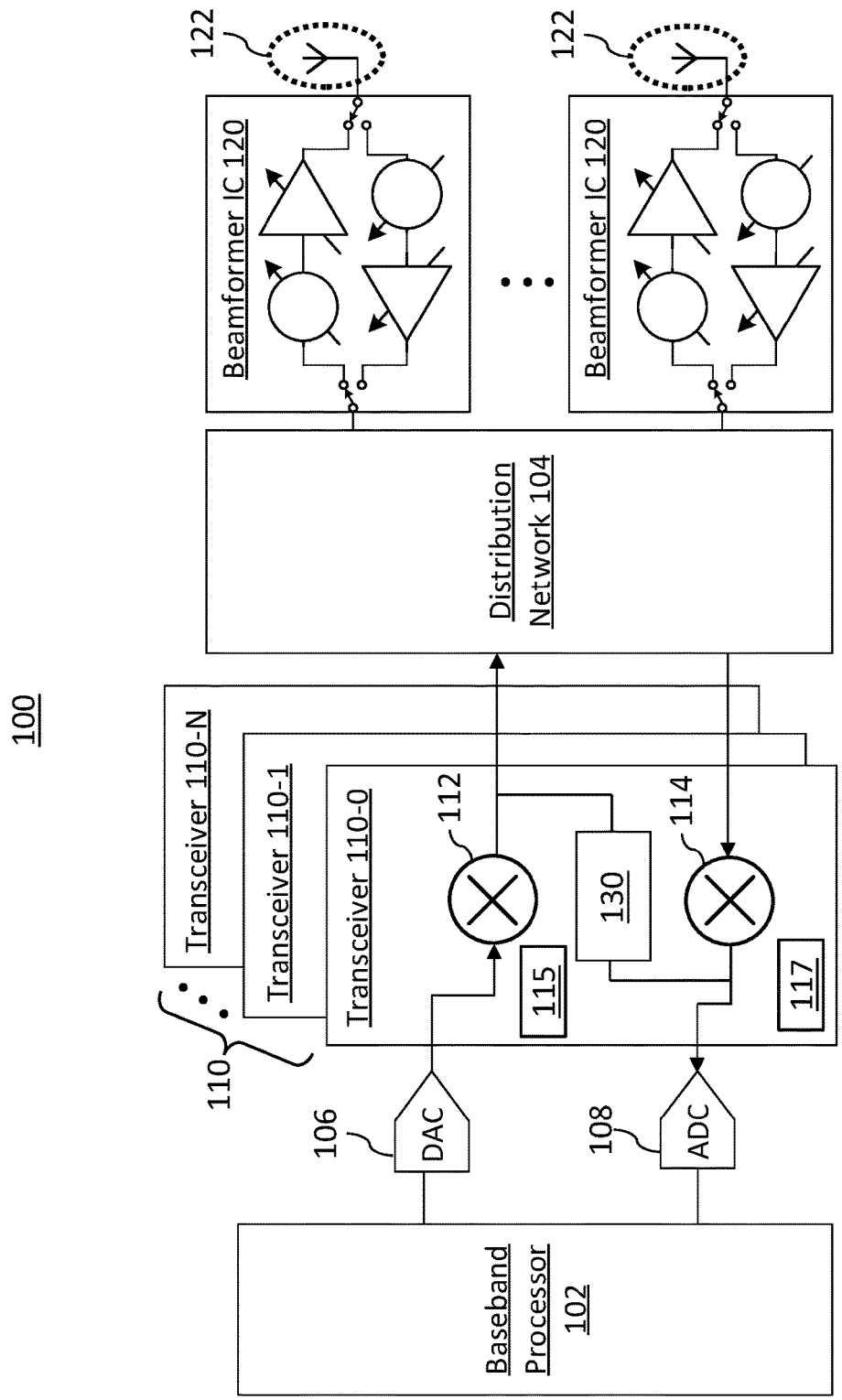
FIG. 1 is a diagram showing an example system that can implement spurious emissions detection and calibration using envelope detector in one embodiment.

FIG. 1 is a diagram showing an example system that can implement spurious emissions detection and calibration using envelope detector in one embodiment. In one or more embodiments, system 100 can be a radio frequency (RF) transmission system implemented by a communication device, such as a RF transceiver. Further, in one or more embodiments, system 100 can be configured to operate at common wireless radio frequencies, millimeter-wave frequencies, and/or microwave frequencies. In one or more embodiments, system 100 can be a part of a wireless communication network, such as fourth generation (4G) wireless communications system, fifth generation (5G) wireless communications system, satellite communication system, point-to-point communications systems such as common data link, and/or other types of wireless communication networks. In one or more embodiments, system 100 can be implemented in a wireless network card.

System 100 can include a baseband processor 102, a plurality of transceivers 110, a distribution network 104, a plurality of beamformer integrated circuits (ICs) 120, and a plurality of antennas 122. The plurality of transceivers 110 can include N transceivers ranging from transceivers 110-0 to 110-N. Each one of the plurality of transceivers 110 can be connected to a set of beamformer ICs among beamformer ICs 120. Each beamformer IC 120 can be connected to one or more antennas 122. The plurality of antennas 122 can include a plurality of individual antennas and/or antenna arrays having different number of antennas. Each antenna among the antennas 122 may output a RF signal having a respective amplitude and phase.

Baseband processor 102 can be, for example, a microprocessor, an application-specific integrated circuit (ASIC), or other type of processors or controllers. In one or more embodiments, baseband processor 102 can be a processor in a wireless network card, or a general microprocessor in a computer that includes a wireless network card implementing system 100. Baseband processor 102 can include various logic circuits and interfaces configured for performing baseband digital signal processing needed for transmission and receiving operations of system 100. In one embodiment, baseband processor 102 can be configured to perform waveform generation, equalization, and/or packet processing associated with the operations of transceivers 110 and beamformer ICs 120. Baseband processor 102 can also be configured to configure, manage and control signal flow direction of transceivers 110 and beamformer ICs 120. For example, baseband processor 102 can send control signals to controllers of transceivers 110 and beamformer ICs 120 to switch between transmission mode and receiving mode.

Beamformer ICs 120 can include a plurality of channels, and each channel can include phase shifters and gain control circuits. Phase settings of the phase shifters and gain settings of the gain control circuits can define phase and/or gains (e.g., amplitudes) of RF signals being outputted by, or being received by, antennas 122. In transmission mode, the phase and gain settings can create phase delays across the channels to produce an interference pattern and cause antennas 122 to focus a beam having a field pattern and beam direction. In receiving mode, the phase and gain settings can create phase delays across the channels to combine RF signals that may be received by antennas 122 from different directions to form a receiver beam having a field pattern and beam direction.

In one embodiment, each one of transceivers 110 can be a single integrated circuit chip. In a transmission mode, baseband processor 102 can send signals to transceivers 110 via one or more digital to analog converters (DAC) 106. Signals being received at transceivers 110, from baseband processor 102 via DAC 106, can undergo processing such as converting the signals to a format that can be transmitted by antennas 122. Distribution network 104 can include a plurality of traces (e.g., unidirectional and/or bidirectional traces) that can route signals from transceivers 110 to beamformer ICs 120 and from beamformer ICs 120 to transceivers 110.

Each transceiver among transceivers 110 can include a controller 115, an upconverting mixer 112, a downconverting mixer 114, and an envelope detector 130. Controller 115 can be a microcontroller configured to control various operations of transceivers 110. For example, controller 115 can be configured to tune upconverting mixer 112 and downconverting mixer 114, enable and disable envelope detector 130, and other operations such as enabling and disabling power amplifiers and low-noise amplifiers that can be embedded in transceivers 110. Further, each transceiver among transceivers 110 can include a frequency synthesizer 117 configured to generate a local oscillator (LO) signal having a reference frequency. In one or more embodiments, frequency synthesizer 117 can be a frequency multiplier, frequency divider, or a buffer. The LO signal can be inputted into upconverting mixer 112 and downconverting mixer 114 to generate signals with higher or lower frequencies. Envelope detector 130 can be integrated in each one of transceivers 110. An input terminal of envelope detector 130 can be connected to an output of upconverting mixer 112 and an output terminal of envelope detector 130 can be connected to an output of downconverting mixer 114. Envelope detector 130 can be an electronic circuit configured to convert an input signal, that can be an amplitude modulated signal, into a demodulated envelope of the input signal.

In an aspect, signal impairments can occur in operations of transceivers 110. Signal processing impairments can include, for example, path imbalance and oscillator leakage. These signal processing impairments can degrade the transceiver's generation of output signals or the processing of input signals. Path imbalance can be an impairment due to unequal performance of an in-phase path (I-path) and a quadrature path (Q-path) of transceivers 110. Path imbalances, or I-Q imbalance, can be caused by a gain difference and/or a phase difference between the I-path and Q-path. Oscillator leakage can be an impairment that can occur when a portion of an oscillator signal feeds through from an input of a mixer to an output of the mixer. Oscillator leakage can cause the oscillator signal to appear in an output from the mixer.

In system 100 shown in FIG. 1, when LO signals generated by frequency synthesizer 117 is inputted into upconverting mixer 112 and downconverting mixer 114, oscillator leakage (or LO leakage) can occur. Controller 115 can be configured to calibrate upconverting mixer 112 and downconverting mixer 114 to reduce LO leakage. In an aspect, controller 115 can calibrate a mixer by tuning bias currents or voltages in the mixer. The amount of calibration or degree of tuning can change due to variations such as components, frequency and temperature variations.

Envelope detector 130 can be integrated in each one of transceiver 110 to tap an output of upconverting mixer 112. The output of upconverting mixer 112 can be fed back to baseband processor 102 via an output signal line of downconverting mixer 114. Using the output signal line of downconverting mixer 114 to feed the output of upconverting mixer 112 back to baseband processor 102 can avoid adding output pins on transceivers 110 for feedback purposes. Further, envelope detector 130 can output an envelope of the output of upconverting mixer 112, where the envelope can be an analog signal. Further, using the output signal line of downconverting mixer 114 can avoid the output of upconverting mixer 112 to go through downconverting mixer 114, hence avoiding a need to perform DC offset calibration. Using the output signal line of downconverting mixer 114 can also allow ADC 108 to convert the envelope into digital signals without a need for additional hardware. Furthermore, using envelope detector 130 to tap the output of upconverting mixer 112 internally (e.g., inside transceivers 110 before a power amplifier stage), instead of tapping an output of the transceivers 110, can avoid a need to use additional hardware, such as spectrum analyzers, to analyze amplified outputs from transceivers 110.

Figure 2:
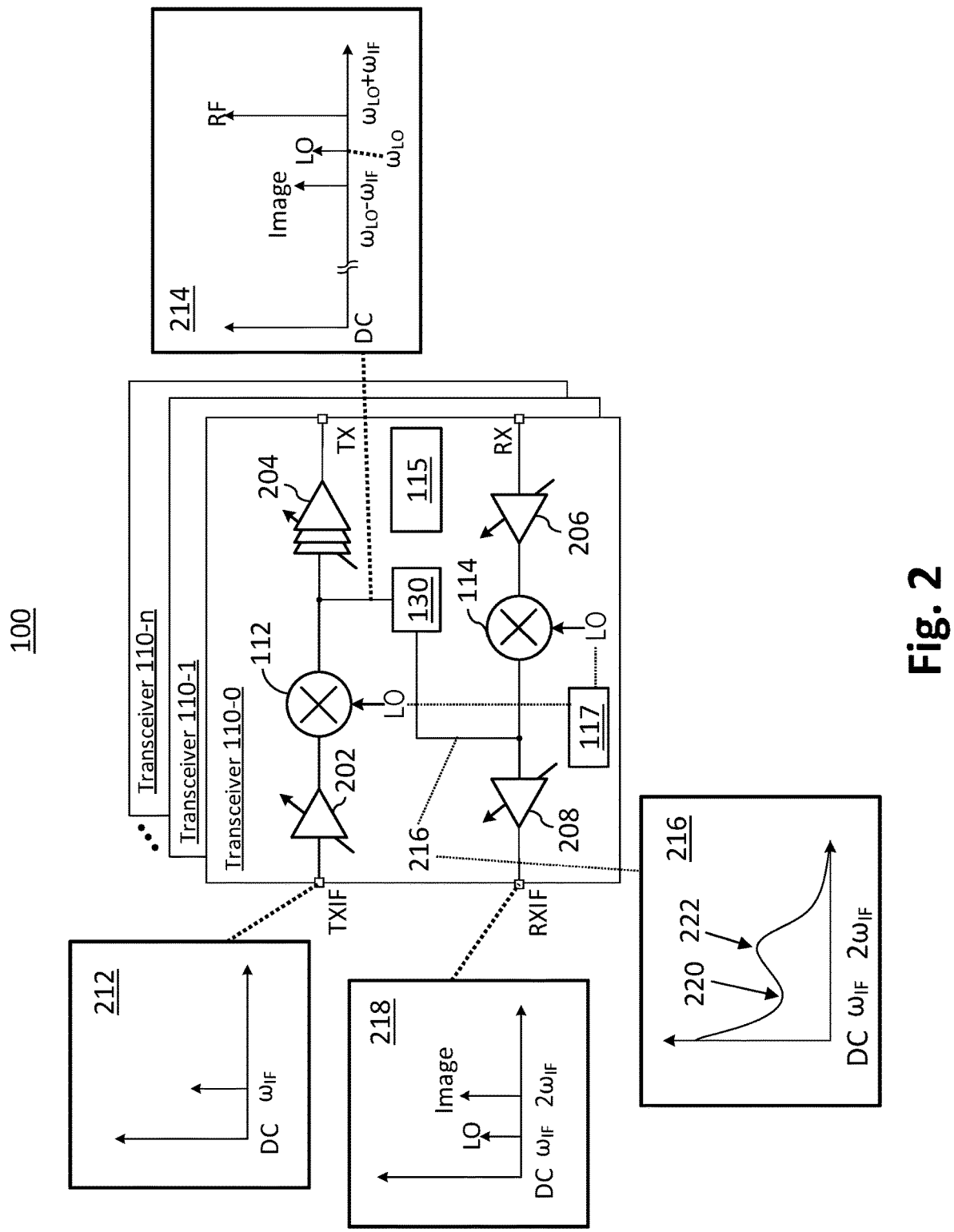
FIG. 2 is a diagram showing additional details of the system of FIG. 1 in one embodiment.

FIG. 2 is a diagram showing additional details of the system of FIG. 1 in one embodiment. In an example shown in FIG. 2, using transceiver 110-0 as an example, each transceiver among transceivers 110 can include input pins TXIF, and RX, and output pins TX and RXIF. Input pin TXIF can receive signals from baseband processor 102 (see FIG. 1) to transceiver 110-0. Input pin TX can receive signals from beamformer ICs 120 via distribution network 104 (see FIG. 1). Output pin TX can provide signals from transceiver 110-0 to beamformer ICs via distribution network. Output pin RXIF can provide signals from transceivers 110 to baseband processor 102.

Further, each one of transceivers 110 can included an amplifier 202, a power amplifier stage 204, a low-noise amplifier (LNA) 206, and a variable gain amplifier (VGA) 208. Amplifier 202 can be an intermediate frequency (IF) amplifier connected between input pin TXIF and an input terminal of upconverting mixer 112. Power amplifier stage 204 can include one or more power amplifiers connected between output pin TX and an output terminal of upconverting mixer 112. LNA 206 can be connected between pin RX and downconverting mixer 114. VGA 208 can be an IF VGA connected between an output terminal of downconverting mixer 114 and pin RXIF.

In one embodiment, an input signal 212 can be provided (e.g., from baseband processor 102) to pin TXIF of transceiver 110-0. Input signal 212 can be a test signal, or a single impulse signal, having intermediate frequency $\omega_{IF}$. Amplifier 202 can amplify input signal 212 before input signal 212 is provided to upconverting mixer 112 as input. Upconverting mixer 112 can mix input signal 212 and LO signal generated by frequency synthesizer 117. LO signal can have a LO frequency of $\omega_{LO}$. In one embodiment, the amplification of input signal 212 by amplifier 202 and the upconverting mixer 112 can increase input signal 212 to an amplitude such that input signal 212 can act as a carrier and any spurious emissions after mixing of input signal 212 with LO signal can appear as modulations.

In one embodiment, envelope detector 130 can tap the output of upconverting mixer 112 at a node between an output terminal of upconverting mixer 112 and power amplifier stage 204. In another embodiment, envelope detector 130 can tap the output of power amplifier stage 204 at a node between power amplifier stage 204 and pin TX. In another embodiment, envelope detector 130 can tap from one of the intermediate nodes of the power amplifier stage 204. The node to tap the output of upconverting mixer 112 can be based on a desired implementation of system 100.

An output of upconverting mixer 112 that is tapped by envelope detector 130 is shown as a transmitter signal 214 in FIG. 2. Transmitter signal 214 can include a desired output signal RF at frequency $\omega_{LO}+\omega_{IF}$. In another embodiment, the system could be a high-side injection with the desired output RF at frequency $\omega_{LO}-\omega_{IF}$. In an aspect every time input signal 212 is passed through a piece of hardware component, such as amplifier 202 and upconverting mixer 112, signal impairment can occur due to process variations of these hardware components. In an example shown in FIG. 2, transmitter signal 214 can include signal impairments such as a LO leak signal at frequency $\omega_{LO}$ and an image signal at frequency $\omega_{LO}-\omega_{IF}$. In an aspect, for high side injection, the image signal would appear at frequency $\omega_{LO}+\omega_{IF}$.

Envelope detector 130 can convert transmitter signal 214 into an envelope 216, where envelope 216 can be an analog signal that is a demodulated envelope of transmitter signal 214. Envelope 216 can be outputted to an output line of downconverting mixer 114 (e.g., a signal line connected to output terminal of downconverting mixer 114). Through the output line of downconverting mixer 114, envelope 216 can be inputted to VGA 208 to strengthen envelope 216. Envelope 216 can be outputted to baseband processor 102 via output pin RXIF. In one embodiment, envelope 216 can be outputted to baseband processor 102 via output pin RXIF and ADC 108 (see FIG. 1). ADC 108 can convert envelope 216 into a calibration signal 218. In one embodiment, ADC 108 can sample envelope 216 at frequencies $\omega_{IF}$ and $2\omega_{IF}$ to generate calibration signal 218. As shown in FIG. 2, calibration signal 218 can include the leaked LO signal at frequency $\omega_{IF}$ and the image signal at $2\omega_{IF}$.

In one embodiment, envelope 216 generated by envelope detector 130 can include additional spurious emissions (e.g., undesired signals) in outputs of upconverting mixer 112. Such additional spurious emissions can include, for example, harmonics of the leaked LO signal, or a linear combination of the leaked LO signal and the IF frequency. In embodiments where envelope detector 130 taps the output of envelope detector at a node between power amplifier stage 204 and pin TX, spurious emissions resulting from hardware process variation of power amplifiers among power amplifier stage 204 can also appear in the output being tapped by envelope detector 130. Hence, the integration of envelope detector 130 in transceivers 110 can facilitate detection of leaked LO signals, image signals, and any spurious emissions that can appear in signals being outputted by transceivers 110.

Baseband processor 102 can receive calibration signal 218 and identify the leaked LO signal at frequency $\omega_{IF}$ and the image signal at $2\omega_{IF}$. Based on the amplitudes of the leaked LO signal at frequency $\omega_{IF}$ and the image signal at $2\omega_{IF}$, baseband processor 102 can generate calibration parameters that can be read or interpretable by controller 115 of transceivers 110. Baseband processor 102 can send the calibration parameters to transceiver 110-0 and controller 115 can use the calibration parameters to tune upconverting mixer 112. In one embodiment, controller 115 can reduce a bias current of upconverting mixer 112 based on the calibration parameters to reduce amplitudes of leaked LO signal and image signal in future outputs of upconverting mixer 112.

In one embodiment, controller 115 can be configured to enable and disable the components of transceivers 110 to operate transceiver 110-0 under a calibration mode. To operate transceivers 110 in calibration mode, controller 115 can disable power amplifier stage 204 and LNA 206. In response to disabling power amplifier stage 204 and LNA 206, controller 115 can enable envelope detector 130 to operate transceiver 110-0 in calibration mode. When power amplifier stage 204 and LNA 206 are disabled and envelope detector 130 is enabled, outputs from upconverting mixer 112 can be tapped by envelope detector 130 to detect spurious emissions. In one embodiment, disabling power amplifier stage 204 and LNA 206 can avoid undesired transmission or interference during the calibration mode. Each transceiver among transceivers 110 can use a respective envelope detector 130 to output different envelopes to calibrate its upconverting mixer 112.

Figure 3:
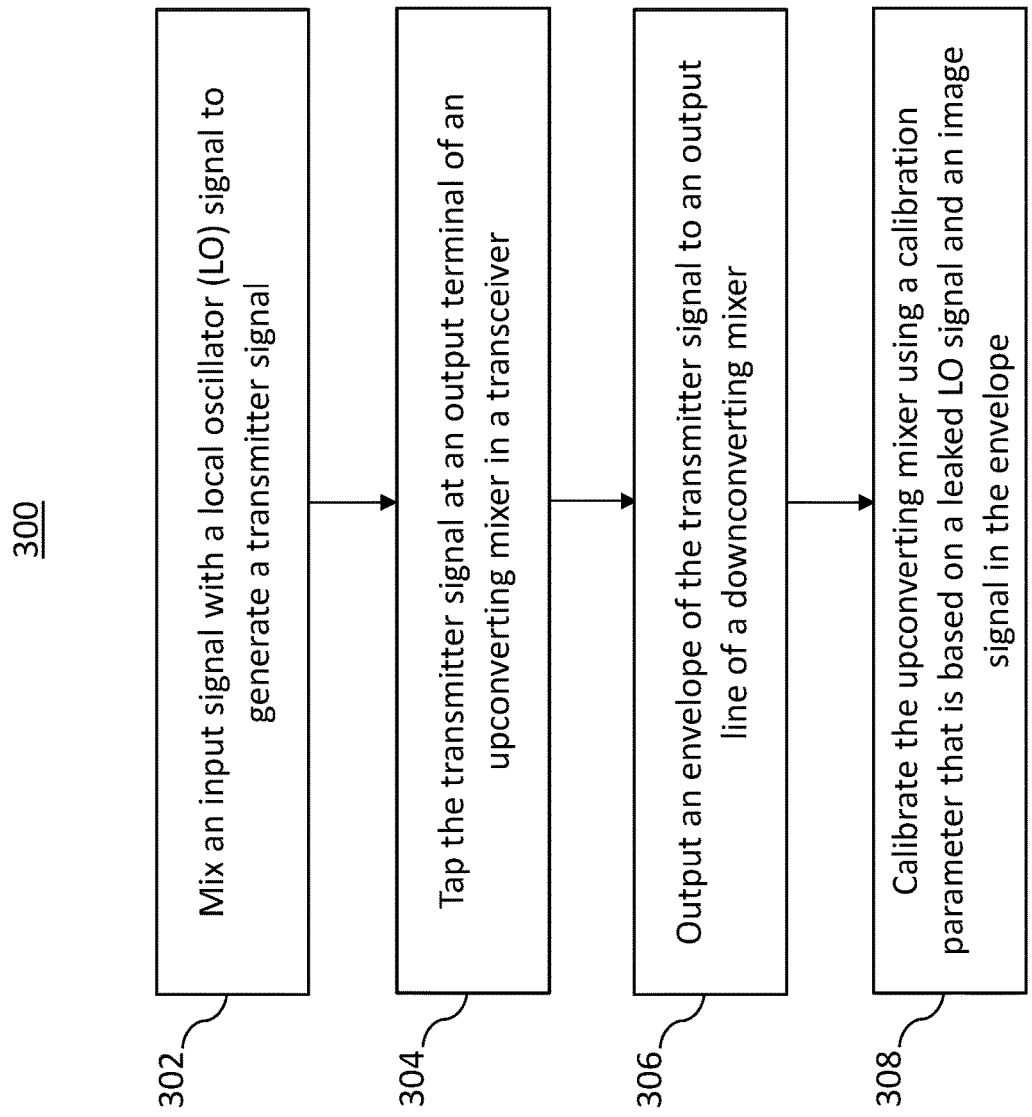
FIG. 3 is a flowchart of an example process that may implement spurious emissions detection and calibration using envelope detector in one embodiment.

FIG. 3 is a flowchart of an example process that may implement spurious emissions detection and calibration using envelope detector in one embodiment. Process 300 in FIG. 3 may be implemented using, for example, system 100 discussed above. An example process may include one or more operations, actions, or functions as illustrated by one or more of blocks 302, 304, 306, and/or 308. Although illustrated as discrete blocks, various blocks may be divided into additional blocks, combined into fewer blocks, eliminated, performed in different order, or performed in parallel, depending on the desired implementation.

Process 300 can be a calibration process performed by a transceiver (e.g., transceivers 110 in FIG. 1 and FIG. 2). Process 300 can begin at block 302. At block 302, an upconverting mixer of the transceiver can mix an input signal with a local oscillator (LO) signal to generate a transmitter signal.

Process 300 can proceed from block 302 to block 304. At block 304, an envelope detector of the transceiver can tap the transmitter signal at an output terminal of the upconverting mixer. In one embodiment, the envelope detector can be connected between an output terminal of the upconverting mixer and an input of a power amplifier in the transceiver.

Process 300 can proceed from block 304 to block 306. At block 306, the envelope detector can output an envelope of the transmitter signal to an output line of a downconverting mixer in the transceiver. The envelope can indicate at least one of a leaked LO signal and an image signal. In one embodiment, the transceiver can output the envelope to a variable gain amplifier.

Process 300 can proceed from block 306 to block 308. At block 308, a controller of the transceiver can calibrate the upconverting mixer using a calibration parameter that is based on the leaked LO signal and the image signal in the envelope. In one embodiment, the leaked LO signal can be at a first frequency in the envelope, and the first frequency can be an intermediate frequency. In one embodiment, the image signal can be at a second frequency in the envelope, and the second frequency can double the intermediate frequency. In one embodiment, the envelope can further indicate at least one harmonic of the LO signal. In one embodiment, the transceiver can output the envelope to a baseband processor. In one embodiment, the calibration parameter can be received at the transceiver from the baseband processor.

In one embodiment, the controller of the transceiver can disable a power amplifier connected to an output terminal of the upconverting mixer. The controller can further disable a low noise amplifier connected to an input terminal of the downconverting mixer. The controller can, in response to disabling the power amplifier and the low noise amplifier, enable an envelope detector to output the envelope.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
   an upconverting mixer configured to mix an input signal with a local oscillator (LO) signal to generate a transmitter signal;
   a downconverting mixer;
   an envelope detector configured to:
      receive the transmitter signal outputted from the upconverting mixer; and
      output an envelope of the transmitter signal to an output line of the downconverting mixer, wherein the envelope indicates at least one of a leaked LO signal and an image signal; and
   a controller configured to:
      disable a power amplifier connected to an output terminal of the upconverting mixer;
      disable a low noise amplifier connected to an input terminal of the downconverting mixer; and
      in response to disabling the power amplifier and the low noise amplifier, enable the envelope detector.

2. The semiconductor device of claim 1, wherein an input terminal of the envelope detector is connected to the output terminal of the upconverting mixer and an input of the power amplifier.

3. The semiconductor device of claim 1, wherein the envelope detector outputs the envelope of the transmitter signal to a variable gain amplifier.

4. The semiconductor device of claim 1, wherein:
   the leaked LO signal is at a first frequency in the envelope, wherein the first frequency is an intermediate frequency; and
   the image signal is at a second frequency in the envelope, wherein the second frequency doubles the intermediate frequency.

5. The semiconductor device of claim 1, wherein the envelope further indicates at least one harmonic of the LO signal.

6. A semiconductor device comprising:
   an upconverting mixer configured to mix an input signal with a local oscillator (LO) signal to generate a transmitter signal;
   a downconverting mixer;
   a controller; and
   an envelope detector configured to:
      receive the transmitter signal outputted from the upconverting mixer; and
      output an envelope of the transmitter signal to an output line of the downconverting mixer, wherein the envelope indicates at least one of a leaked LO signal and an image signal,
   wherein the controller is configured to:
      disable a power amplifier connected to an output terminal of the upconverting mixer;
      disable a low noise amplifier connected to an input terminal of the downconverting mixer;
      in response to disabling the power amplifier and the low noise amplifier, enable the envelope detector;
      receive a calibration parameter that is based on at least one of the leaked LO signal and image signal; and
      calibrate the upconverting mixer based on the calibration parameter.

7. The semiconductor device of claim 6, wherein an input terminal of the envelope detector is connected between the output terminal of the upconverting mixer and an input of the power amplifier.

8. The semiconductor device of claim 6, wherein the envelope detector outputs the envelope of the transmitter signal to a variable gain amplifier.

9. The semiconductor device of claim 6, wherein:
the leaked LO signal is at a first frequency in the envelope, wherein the first frequency is an intermediate frequency; and
the image signal is at a second frequency in the envelope, wherein the second frequency doubles the intermediate frequency.

10. The semiconductor device of claim 6, wherein the envelope further indicates at least one harmonic of the LO signal.

11. The semiconductor device of claim 6, wherein the envelope is outputted to a baseband processor, and the controller is configured to receive the calibration parameter from the baseband processor.

12. A method for operating a transceiver, the method comprising:
mixing an input signal with a local oscillator (LO) signal to generate a transmitter signal;
disabling a power amplifier connected to an output terminal of an upconverting mixer;
disabling a low noise amplifier connected to an input terminal of an downconverting mixer;
in response to disabling the power amplifier and the low noise amplifier, enabling an envelope detector to output an envelope;
tapping the transmitter signal at an output terminal of the upconverting mixer in the transceiver;
outputting the envelope of the transmitter signal to an output line of the downconverting mixer in the transceiver, wherein the envelope indicates at least one of a leaked LO signal and an image signal; and
calibrating the upconverting mixer utilizing a calibration parameter that is based on the leaked LO signal and the image signal in the envelope.

13. The method of claim 12, wherein outputting the envelope of the transmitter signal comprises operating the envelope detector to convert the transmitter signal into the envelope, and wherein the envelope detector is connected between the output terminal of the upconverting mixer and an input of the power amplifier.

14. The method of claim 12, further comprising outputting the envelope to a variable gain amplifier.

15. The method of claim 12, wherein:
the leaked LO signal is at a first frequency in the envelope, wherein the first frequency is an intermediate frequency; and
the image signal is at a second frequency in the envelope, wherein the second frequency doubles the intermediate frequency.

16. The method of claim 12, wherein the envelope further indicates at least one harmonic of the LO signal.

17. The method of claim 12, further comprising outputting the envelope to a baseband processor.

18. The method of claim 17, wherein the calibration parameter is received at the transceiver from the baseband processor.

* * * * *